Jan. 31, 1956     O. P. MANDRAPA     2,732,945
HONEY EXTRACTING MACHINES
Filed April 1, 1952     3 Sheets-Sheet 1

INVENTOR.
OBREN P. MANDRAPA
BY
ATTORNEY

Jan. 31, 1956    O. P. MANDRAPA    2,732,945
HONEY EXTRACTING MACHINES
Filed April 1, 1952    3 Sheets-Sheet 2

INVENTOR.
OBREN P. MANDRAPA
BY
ATTORNEY

Jan. 31, 1956 — O. P. MANDRAPA — 2,732,945
HONEY EXTRACTING MACHINES
Filed April 1, 1952 — 3 Sheets-Sheet 3

INVENTOR.
OBREN P. MANDRAPA
BY
ATTORNEY

United States Patent Office 2,732,945
Patented Jan. 31, 1956

2,732,945

HONEY EXTRACTING MACHINES

Obren P. Mandrapa, Calexico, Calif.

Application April 1, 1952, Serial No. 279,855

5 Claims. (Cl. 210—65)

My invention relates to honey extracting machines, particularly as adapted for removing honey through the exercise of centrifugal action from the honeycomb; and its objects are to provide a better and more efficient means for centrifugally emptying the honey from the combs without crushing or injury thereto, and after said extraction to render the same combs immediately available as comb-foundations for the refilling thereof upon their return to the hive; to dispense with the high degree of skill required of the workman for the efficient operation of the extractors now upon the market, and to furnish an improved form of extractor the operation of which is largely automatic in character and the mode of which may be successfully performed by an ordinary routine workman of less experience and at less expense; to reduce greatly the number of parts heretofore thought necessary for the efficient operation of the extractor, thereby rendering the same more compact and resulting in economy of space and saving of material; to bring about the required centrifugal action with less speed and less application of power, and thereby to guard against the breaking down and damaging of the drawn combs for further use in the supers; to provide a better assembly and association of the baskets for holding the frames of the honey-combs, and the ready insertion and removal of said frames from said baskets; to provide a better means for controlling the starting, stopping and smooth continuation of the centrifugal turning mechanism to the degree required for keeping intact the body of the combs while allowing the complete removal of the honey therefrom; to render the parts accessible for inspection, adjustment, replacement, removal or repair, and in general to provide a honey extractor which is economical of construction, saving of labor, efficient in action and of prolonged life and durability. My invention further consists of other novel features of construction, and combinations and arrangements of elements and parts illustrated in the drawing and hereinafter more specifically described and claimed.

Attention is hereby directed to the accompanying drawing, illustrating a preferred form of my invention, in which similar numerals of designation refer to similar parts throughout the several views, and in which.

Figure 1:
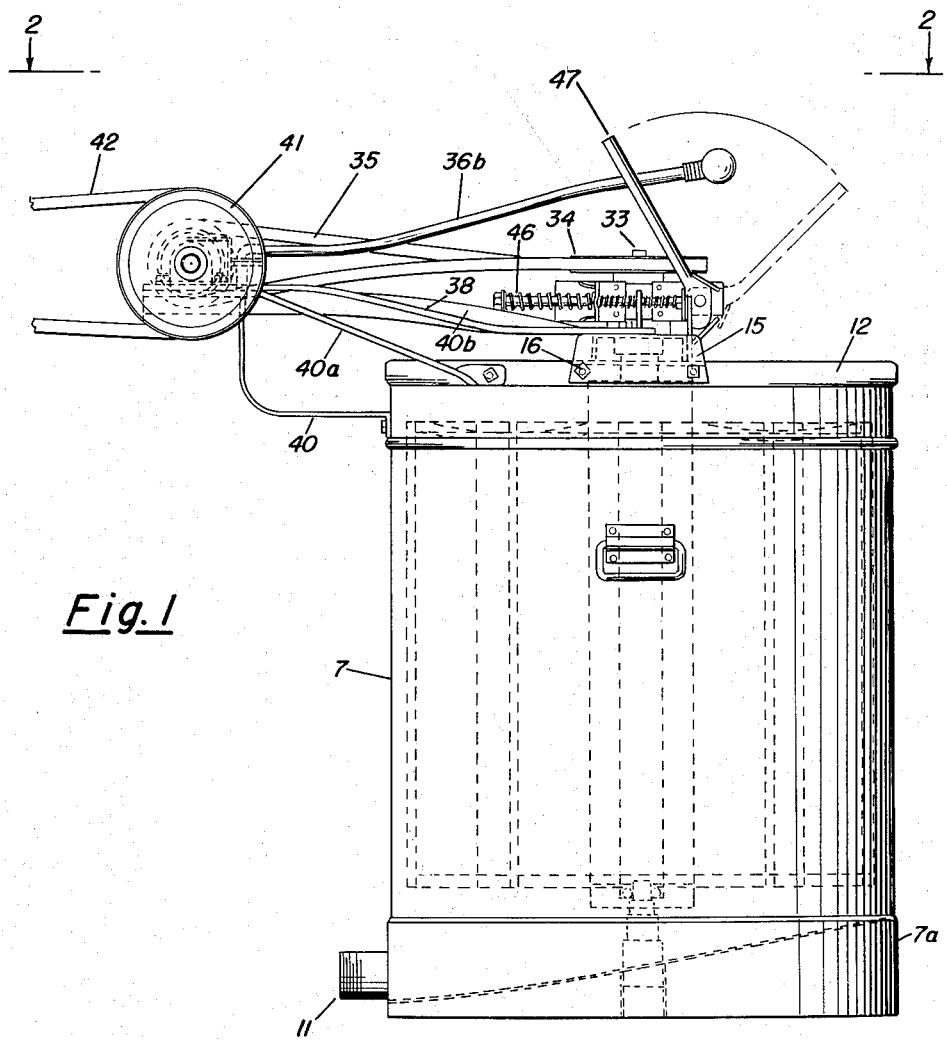
Figure 1 is a side elevation of the can serving to house the comb baskets and mountings therefor and the mechanism for rotating the same and centrifugally expelling the contents thereof, and also showing pulley and belt connections and starting, stopping and braking devices.

Referring to the drawing, the honey extracting apparatus there shown generally comprises the upright open can 7, the hollow shaft 8, the comb basket supporting frame 9, all of which parts are preferably of metal, together with pulley and belt connections therefor, and braking devices.

The can 7 is cylindrical in shape, and has its base 7a enlarged to form the chamber 7b, with the inclined bottom 10 and the outlet 11 leading therefrom; the annular wall of said base being shaped at the bottom to rest horizontally upon the floor or ground and to cause the said can to maintain an upright position. The top of the can is preferably turned inwardly to form the circular fluted rim 12, upon which, and extending centrally across the mouth of the can, rests the channel iron forming the bridge 13, whose respective ends are welded or otherwise firmly secured to the curved plates 14 and 15, conforming to the curvature of the wall of the can 7 and securely fastened thereto by bolts 16.

As shown, the central portion of the inclined bottom 10 is provided with the cylindrical socket 17, the walls of which downwardly extending terminate in the annular flange 18 in planar engagement with the said ground or floor; the axis of said socket being in lower extension of and in alignment with the axis of the said can. Welded or securely lodged within said socket is the gudgeon 19, having successive extensions reduced in diameter arising therefrom and at the top forming with the cap 20 the boxed in raceway 21 for the ball bearings 22. Secured to the inturned edge of the said cap 20 is the annular inwardly protruding ledge 23 located at the bottom 24 of the hollow shaft 8, and welded to the wall thereof; the said shaft arising perpendicularly and having its axis coincident with the axis of the said can and, by reason of its mounting upon said cap, arranged readily to rotate therewith upon the ball bearings 22. This shaft 8 is a long metallic cylinder of large diameter (preferably one-fifth or more of the diameter of said can) and has a wall of substantial thickness, to which are welded the apex points 25 and 26 of the triangular top and bottom plates 27a and 27b of the frame 9. Incorporated in said frame are the comb baskets a, b, c, d, e, f, g, h, radially encircling the cylinder of said shaft. Each of these comb baskets is open at the top and extends the full height of said frame, and is shaped to receive and hold the rectangular section of a conventional honeycomb of the size employed. The sides of each of said baskets are open except for wires 28 extending at intervals across the same the inner ends of said wires being welded to the angle irons 48 extending vertically between and being welded to the plates 27a and 27b adjacent to the apexes thereof, and said wires being preferably in spaced parallel relation, and in sufficient number to hold the section in fixed radially extended vertical position, and so as not to interfere materially with extraction of the honey by centrifugal action upon rotation of the frame 9.

Welded to and within the wall of said hollow shaft near the top thereof, are the spaced metallic washer-like discs 29 and 30, in the central openings of which and to the walls thereof is welded and secured the rounded gudgeon 31, whose axis coincides with the axis of said shaft and is in alignment with the axis of the gudgeon 19. Centrally located upon the underside of the web of the channelled bridge 13 is mounted the ball-bearing 32, within which is journalled the upper portion of the gudgeon 31, the reduced upper extension 33 of which, passing through an opening in said web provided therefor, is firmly fastened to the pulley 34, connected by the belt 35, to pulley 36 secured slidably to the clutch 36a mounted upon the countershaft 37, near one end 37a thereof.

Figure 2:
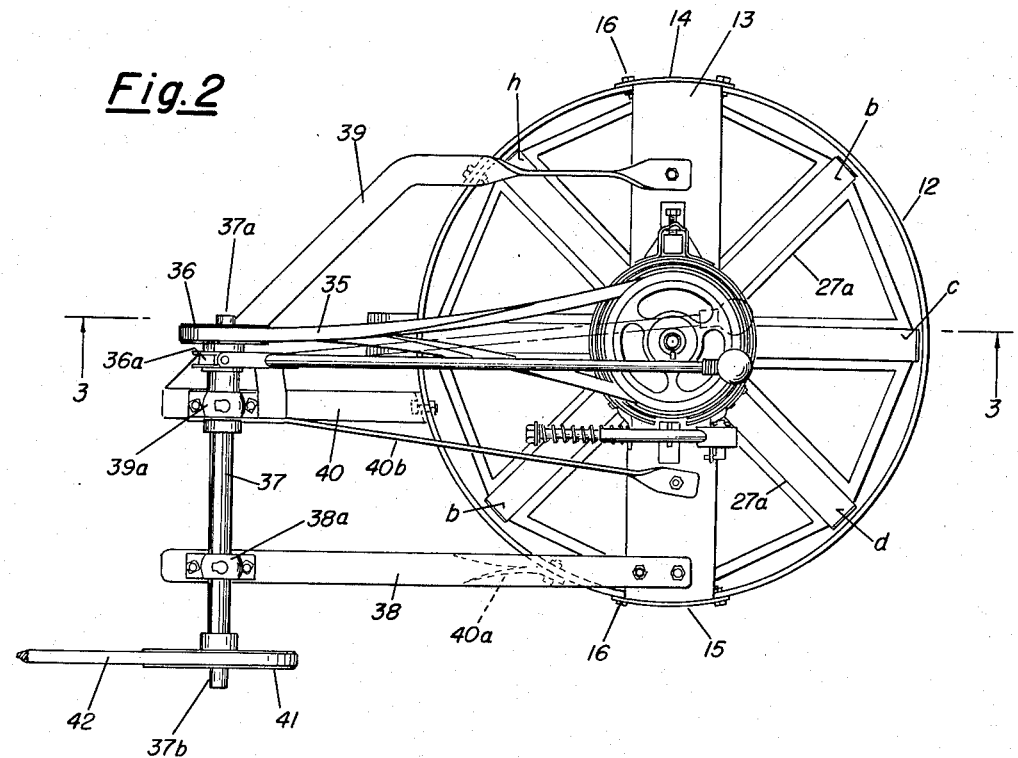
Fig. 2 is a plan view of the apparatus and connections shown in Fig. 1 looking in the direction indicated by the arrows 2—2.
Figure 5:
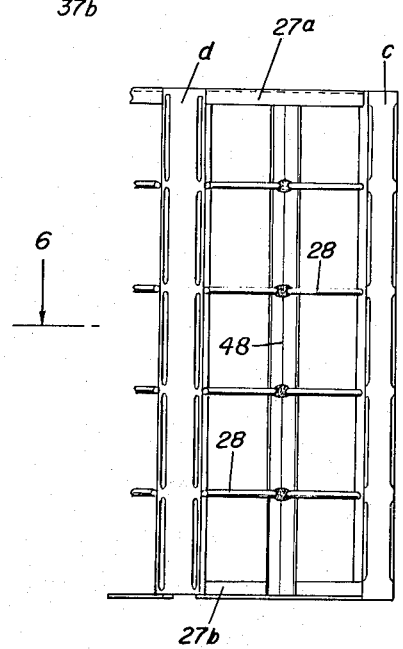
Fig. 5 is a side view in elevation of two adjacent comb baskets of Fig. 4, looking in the direction indicated by the arrows 5—5.
Figure 6:
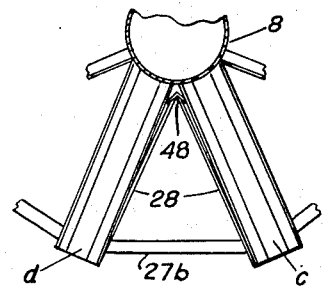
Fig. 6 is a horizontal sectional view on line 6—6 of the two comb baskets shown in Fig. 5 looking downwardly in the direction indicated by the arrows.

As shown more particularly in Figs. 1 and 2, the countershaft 37 is journalled in bearings 38a and 39a mounted upon the outer ends of brackets 38 and 39, the inner ends of which are firmly secured by bolts or screws to the bridge 13; the elbow brace 40, securely attached to the bracket 39 and also to the wall of the can 7 near the top thereof, the bracket 40b connected to the side of said elbow brace and secured to said bridge, and the brace 40a connecting the bracket 38 and shaft 37 with the rim 12, serving to firmly hold and support the said brackets in extended position. Upon the end 37b of the said shaft is mounted the pulley 41 connected by the belt 42 to a motor or other source of power. For operating the said clutch, I provide the handle 36b or other conventional form of control.

Figure 3:
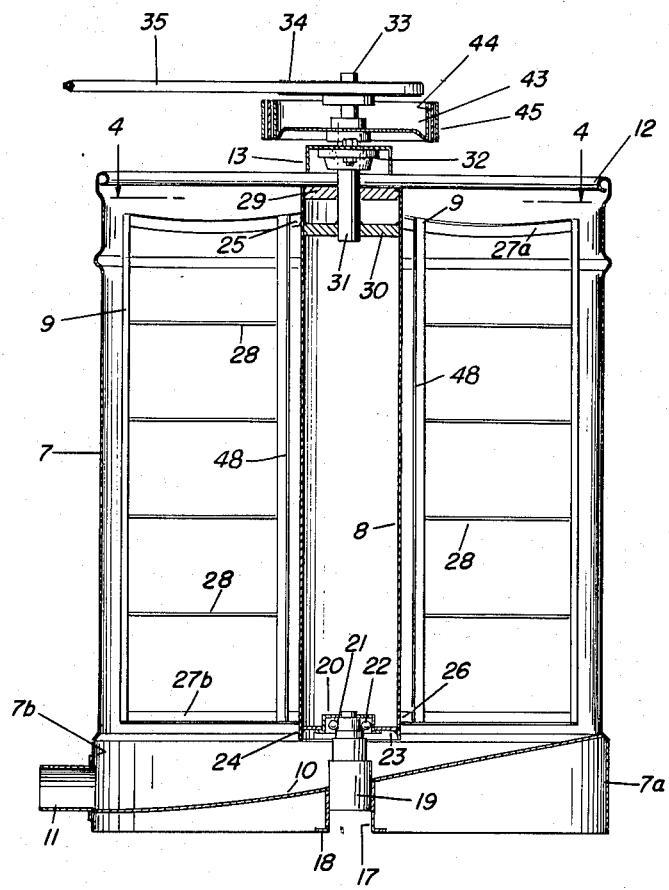
Fig. 3 is a vertical sectional view on line 3—3 of Fig. 2, looking in the direction indicated by the arrows.
Figure 4:
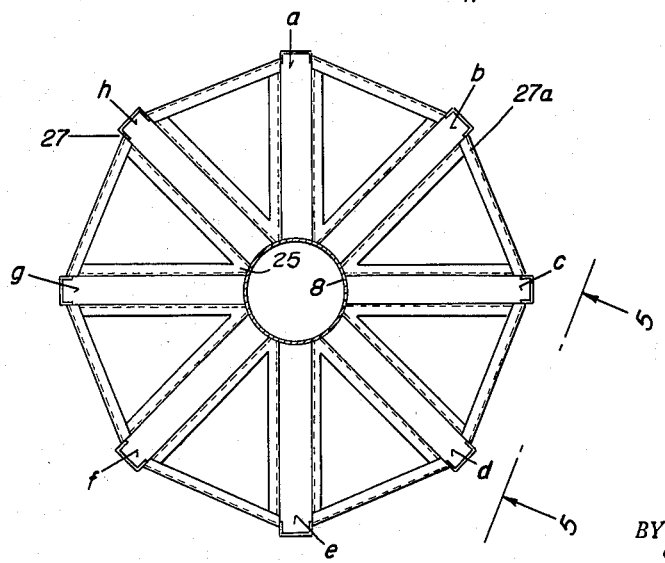
Fig. 4 is a horizontal sectional view on line 4—4 of Fig. 3, looking downwardly in the direction indicated by the arrows.

To furnish a more effective means for controlling the rotation of the comb basket frame 9, and the starting and stopping of such movement, I preferably provide the form of braking mechanism shown in detail in Figs. 1, 2 and 3, comprising the drum 43, firmly affixed to the upper portion of the shaft 8, above bridge 13 and below the pulley 34; the brake lining 44, enclosed by and in contact with said drum; the shoe 45, encompassing said lining and conventionally connected to compression spring actuating means 46, mounted upon the bridge 13; and the control lever 47 or other well known device connected with and for operating the said brake, and for starting, slowing up, or stopping the rotation of said basket frame.

In operating my aforesaid honey extracting machine, the full combs of honey, of the size for the handling of which said machine is adapted, are uncapped on each side in accordance with the usual practice, and then the sections of said combs are respectively introduced within the comb baskets of the frame 9, care being taken to guard against the breakage of said combs and to effect, if possible, a balancing of the weight of the combs radially about the shaft 8 to prevent undue strain thereon and to secure even rotation thereof. As will be observed from the drawing, the sections of comb when lodged in said comb baskets radiate circumferentially from the rounded wall of the hollow large sized shaft 8, so that while the inner ends of the said combs are at a substantial distance away from the center of rotation and thereby subject to increased centrifugal action, the outer ends of said radiating combs extend outwardly in constantly increasing spaced relation until closely adjacent to the wall of the can 7 and in wide separation; the arrangement being such that upon rotation of the shaft 8, ample clearance of the combs one from all of the others is secured, and the ready escape of the honey from the honeycombs and the unimpeded casting of such honey from the comb against the wall of the can 7 centrifugally and effectively accomplished upon rotation of said shaft and attached comb basket frame 9 containing the said combs.

Upon the sections of comb being introduced into the comb baskets as aforesaid, the pulley and belt motive elements of the apparatus are connected in operative relation through the operation of the clutch 36a, and the shaft 8 and frame 9 caused to rotate rapidly, the rate of speed of such rotation being manually controlled by the workman through the use of the braking mechanism hereinbefore described, care being taken not to rotate the frame too rapidly and thereby to break or crush the combs. As the honey is being extracted it will be thrown outwardly against the wall of the can and will flow downwardly to the inclined bottom 10, from whence it will flow outwardly and be discharged through the outlet 11 into a receptacle provided therefor.

From the foregoing it will be seen that the present invention provides the rectangular comb receiving baskets a–h inclusive by placing about the hollow tubular shaft 8 a series of triangular open work frames which include the inner angle members 48, the outer channel members 9 and the vertically spaced horizontal wires 28. The inner ends of the triangular plates 27a and 27b welded or otherwise secured directly to the outer circumference of the tubular shaft 8. When the frames are thus secured to the shaft, juxtaposed sides of each triangular plate provide the rectangular comb receiving baskets referred to. The channel 9 has its inwardly directed flanges secured to the facing sides of each top and bottom plate 27a and 27b respectively.

By reason of the great diameter and large size of the hollow shaft 8, as well as the wide, open, expending and diverging spaced relation of the radiating comb baskets of the frame 9, the centrifugal action of the apparatus is greatly facilitated, increased and rendered more efficient, and, so far as I am aware, the honey more expeditiously, safely and completely removed from the comb and with less loss from breakage than has heretofore been deemed possible in the art. After a successful business experience of twenty-eight years in the beekeeping business in Southern California, I have had considerable experience in using the various honey extracting machines in common use by beekeepers, and have found that such machines have many disadvantages, because complicated, expensive, inefficient, and because of breakage of the combs, which disadvantages I believe largely to have been eliminated by my invention as illustrated in the drawing and as above described.

My invention may be embodied in other specific forms without departing from the spirit or essential characteristics thereof. The present embodiments, as above set forth are therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. In a honey extracting machine, the combination of a can; a hollow shaft of large diameter rotatably mounted within said can; a series of open-work frames which are attached to upper and lower triangular plates having their inner ends connected directly with the wall of said shaft and radiating in spaced flaring relation therefrom whereby the sides of adjacent frames form rectangular comb receiving baskets, and means for rotating said shaft carrying said comb baskets and centrifugally discharging therefrom against the wall of said can the honey of honeycombs when introduced within said baskets.

2. In a honey extracting machine, the combination of a cylindrical can; a hollow shaft of large diameter rotatably mounted within said can with its axis coincident with the axis of said can; a series of triangular open-work frames which are attached to upper and lower triangular plates having their inner ends connected directly with the wall of said shaft and radiating in spaced flaring relation therefrom toward the wall of said can whereby the sides of adjacent frames form rectangular comb receiving baskets; and means for rotating said shaft carrying said comb baskets and centrifugally discharging therefrom against the wall of said can the honey of honeycombs introduced within said baskets.

3. In a honey extracting machine, the combination of a cylindrical can, a power driven cylindrical hollow shaft rotatably mounted in the can, a radially disposed series of skeletal triangular frames which are attached to upper and lower triangular plates secured directly to the outer side of the hollow shaft, the sides of said frames arranged to provide therebetween rectangular radially disposed comb receiving baskets extending vertically substantially throughout the height of the shaft and accessible from the top of the can, and means for rotating said shaft carrying said comb baskets and centrifugally discharging therefrom against the wall of said can the honey of the honeycombs carried within said baskets.

4. In a honey extracting machine according to claim 3, wherein the hollow tubular shaft is provided with a gudgeon, and manually controlled braking means is carried by said gudgeon.

5. In a honey extracting machine, the combination of a cylindrical can, a power driven cylindrical hollow shaft, a series of triangular frames each including top and bottom plates comprising triangularly disposed members each secured at their inner apical ends directly to the shaft, an inner vertically disposed angle member connected at its upper and lower ends respectively adjacent said apical ends of the plates, and an outer vertically disposed channel member having its side flanges connecting adjacent top and bottom plates, horizontally disposed wires connecting the angle and channel members to form basket sides, said sides and the juxtaposed edges of adjacent top and bottom plates forming rectangular comb receiving baskets disposed radially of the hollow shaft, and means for rotating said shaft carrying said comb baskets and centrifugally discharging therefrom against the wall of said can the honey of the honeycombs when introduced into said baskets.

References Cited in the file of this patent

UNITED STATES PATENTS

| | | |
|---|---|---|
| 1,559,319 | Herrod-Hempsall | Oct. 27, 1925 |
| 1,657,717 | Hodgson | Jan. 31, 1928 |
| 1,730,593 | Root | Oct. 8, 1929 |
| 1,791,605 | Root | Feb. 10, 1931 |
| 2,203,438 | Maendel | June 4, 1940 |

FOREIGN PATENTS

| | | |
|---|---|---|
| 129,492 | Switzerland | Dec. 17, 1928 |